(12) United States Patent
Stevenson et al.

(10) Patent No.: US 10,131,857 B2
(45) Date of Patent: Nov. 20, 2018

(54) GASIFICATION QUENCH SYSTEM

(71) Applicant: General Electric Company, Schenectady, NY (US)

(72) Inventors: John Saunders Stevenson, Anaheim, CA (US); Pravin Sadashiv Naphade, Bangaluru (IN)

(73) Assignee: General Electric Company, Schenectady, NY (US)

( * ) Notice: Subject to any disclaimer, the term of this patent is extended or adjusted under 35 U.S.C. 154(b) by 109 days.

(21) Appl. No.: 15/429,099

(22) Filed: Feb. 9, 2017

(65) Prior Publication Data

US 2018/0223201 A1 Aug. 9, 2018

(51) Int. Cl.
| | |
|---|---|
| *C10J 3/84* | (2006.01) |
| *F28C 3/06* | (2006.01) |
| *F28F 9/22* | (2006.01) |
| *B01D 45/08* | (2006.01) |
| *B01D 47/02* | (2006.01) |
| *B01D 50/00* | (2006.01) |

(52) U.S. Cl.
CPC .............. *C10J 3/845* (2013.01); *B01D 45/08* (2013.01); *B01D 47/021* (2013.01); *B01D 50/004* (2013.01); *F28C 3/06* (2013.01); *F28F 9/22* (2013.01); *C10J 2300/1603* (2013.01); *F28F 2009/228* (2013.01)

(58) Field of Classification Search
CPC .......... C10J 3/84; B01D 45/08; B01D 47/021; B01D 50/004; F28C 3/06
See application file for complete search history.

(56) References Cited

U.S. PATENT DOCUMENTS

| | | | | | |
|---|---|---|---|---|---|
| 2,818,326 | A | * | 12/1957 | Eastman .................. | C01B 3/32 261/121.1 |
| 4,005,999 | A | * | 2/1977 | Carlson ................ | B01D 47/024 261/119.1 |
| 4,239,515 | A | * | 12/1980 | Yanagioka ........... | B01D 53/504 261/122.1 |
| 4,494,963 | A | * | 1/1985 | Reich ....................... | C10J 3/485 48/69 |
| 4,581,899 | A | * | 4/1986 | von Klock ............... | C10J 3/485 261/112.1 |
| 4,605,423 | A | * | 8/1986 | Koog ...................... | C10J 3/485 48/69 |
| 4,778,483 | A | * | 10/1988 | Martin ................. | B01D 47/024 48/69 |

(Continued)

*Primary Examiner* — Matthew J Merkling
(74) *Attorney, Agent, or Firm* — Fletcher Yoder, P.C.

(57) ABSTRACT

A system includes a quench system that may cool a syngas generated in a gasification chamber. The quench system includes a quench chamber, a dip tube that may direct the syngas from the gasification chamber into a quench liquid to cool the syngas to generate a cooled syngas, a draft tube disposed circumferentially about the dip tube and that may receive the cooled syngas in a first direction. A first passage is disposed between a first wall of the dip tube and a second wall of the draft tube. The system also includes a first baffle that may receive the cooled syngas from the first passage. The first baffle may split a flow of the cooled syngas into a first syngas flow and a second syngas flow, and the first baffle may redirect the first syngas flow in a second direction different from the first direction.

19 Claims, 5 Drawing Sheets

(56) References Cited

U.S. PATENT DOCUMENTS

| | | | | |
|---|---|---|---|---|
| 4,828,578 | A * | 5/1989 | Den Bleyker | B01J 19/0013 48/69 |
| 6,113,739 | A * | 9/2000 | Nilsson | D21C 11/06 162/30.1 |
| 6,238,468 | B1 * | 5/2001 | Nilsson | D21C 11/04 95/226 |
| 8,673,036 | B2 * | 3/2014 | Tiwari | C10J 3/84 261/110 |
| 8,758,458 | B2 | 6/2014 | Tiwari et al. | |
| 9,404,054 | B2 * | 8/2016 | Karmakar | C10K 1/046 |
| 2010/0140817 | A1 * | 6/2010 | Harteveld | C10J 3/485 261/112.1 |
| 2010/0325956 | A1 * | 12/2010 | Dinu | C10J 3/485 48/85 |
| 2010/0325957 | A1 * | 12/2010 | Klockow | C10J 3/84 48/87 |
| 2011/0067304 | A1 * | 3/2011 | Klockow | B01D 47/021 48/87 |
| 2011/0120009 | A1 * | 5/2011 | Klockow | B01D 47/021 48/87 |

\* cited by examiner

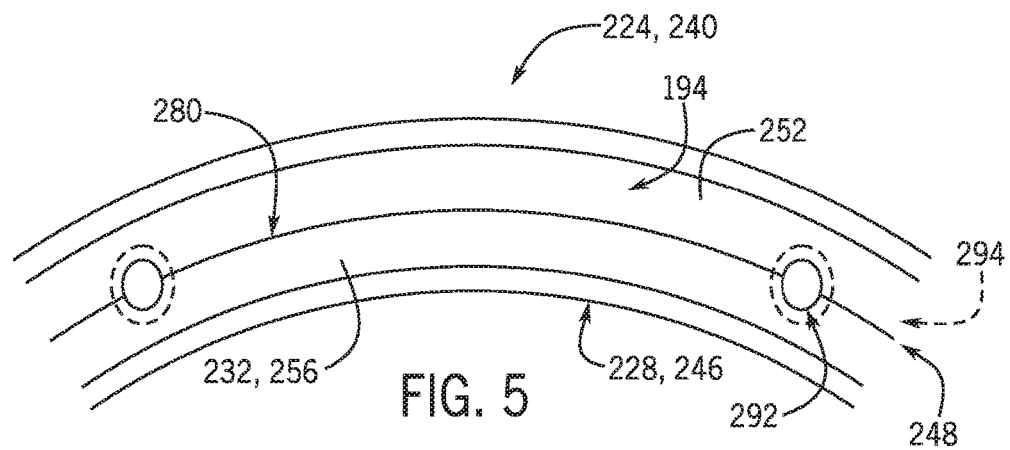
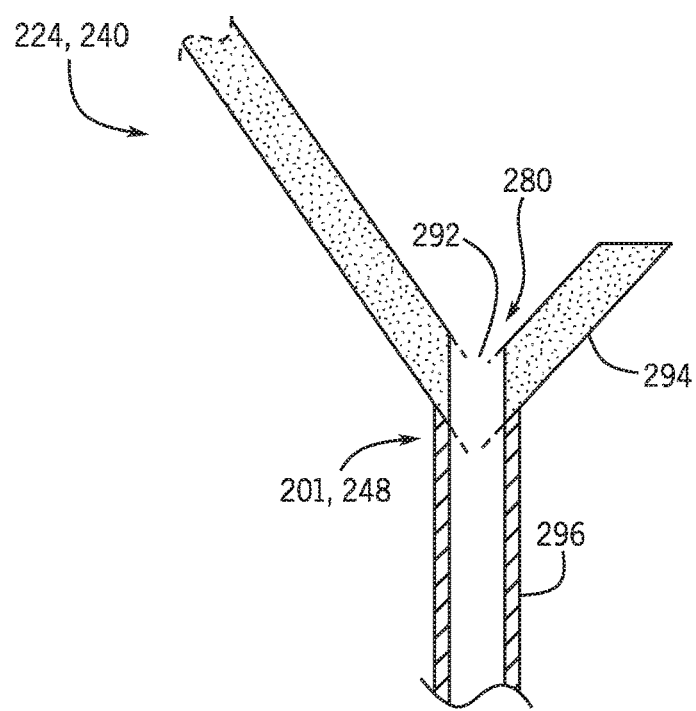

GASIFICATION QUENCH SYSTEM

BACKGROUND

The subject matter disclosed herein relates to gasification systems and, more particularly, to quench system configurations for separating entrained quench liquid from syngas.

Fossil fuels, such as solid coal, liquid petroleum, or biomass, may be gasified for use in the production of electricity, chemicals, synthetic fuels, or for a variety of other applications. Gasification involves reacting a carbonaceous fuel and oxygen at a very high temperature to produce synthesis gas, commonly referred to as syngas, which is a fuel containing carbon monoxide and hydrogen. Syngas combusts more efficiently and cleaner than the fuel in its original state before gasification. In addition to the syngas, gasification may also generate several by-products such as carbon dioxide, hydrogen sulfide, ammonia, slag, fine particles of ash, and unconverted carbon. Accordingly, prior to use, the syngas may be cooled and further processed to separate the by-products from the syngas.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a quench system that may cool a syngas generated in a gasification chamber. The quench system includes a quench chamber, a dip tube that may direct the syngas from the gasification chamber into a quench liquid to cool the syngas to generate a cooled syngas, a draft tube disposed circumferentially about the dip tube and that may receive the cooled syngas in a first direction. A first passage is disposed between a first wall of the dip tube and a second wall of the draft tube. The system also includes a first baffle that may receive the cooled syngas from the first passage. The first baffle may split a flow of the cooled syngas into a first syngas flow and a second syngas flow, and the first baffle may redirect the first syngas flow in a second direction different from the first direction.

In a second embodiment, a system includes a draft tube that may mount about a dip tube in a quench system of a gasifier downstream from a gasification chamber. The draft tube may receive a cooled syngas flow from a quench liquid in a first direction. The system also includes a first baffle that may split a flow of the cooled syngas from the draft tube into a first syngas flow and a second syngas flow, and the first baffle may redirect the first syngas flow in a second direction different from the first direction.

In a third embodiment, a method, includes routing a syngas from a gasification chamber, through a dip tube, and into a quench liquid to cool the syngas to generate a cooled syngas, routing the cooled syngas in a first flow direction through a passage between the dip tube and a draft tube disposed circumferentially about the dip tube, and splitting a flow of the cooled syngas to generate a first syngas flow and a second syngas flow using a baffle positioned adjacent to the draft tube. The baffle includes a wall extending between a first end and a second end radially and axially spaced apart from the first end and the first end is disposed within the passage and the second end is circumferentially about the draft tube. The method also includes directing the first syngas flow into an annular space circumferentially about the dip tube, the draft tube, and the baffle in a second direction that is different from the first direction.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 5 is a top-view of an embodiment of a gutter that may be used with the annular baffle of FIGS. 1-4, whereby the gutter includes a groove for collecting the entrained quench liquid separated from the syngas and one or more openings for directing the collected quench liquid to a quench pool for reuse; and FIG. 6 is a cross-sectional view of an embodiment of a gutter that may be used with the annular baffle of FIGS. 1-4, whereby the gutter includes an extension extending from one or more openings that direct the collected quench liquid to a quench pool for reuse.

DETAILED DESCRIPTION

Figure 1:
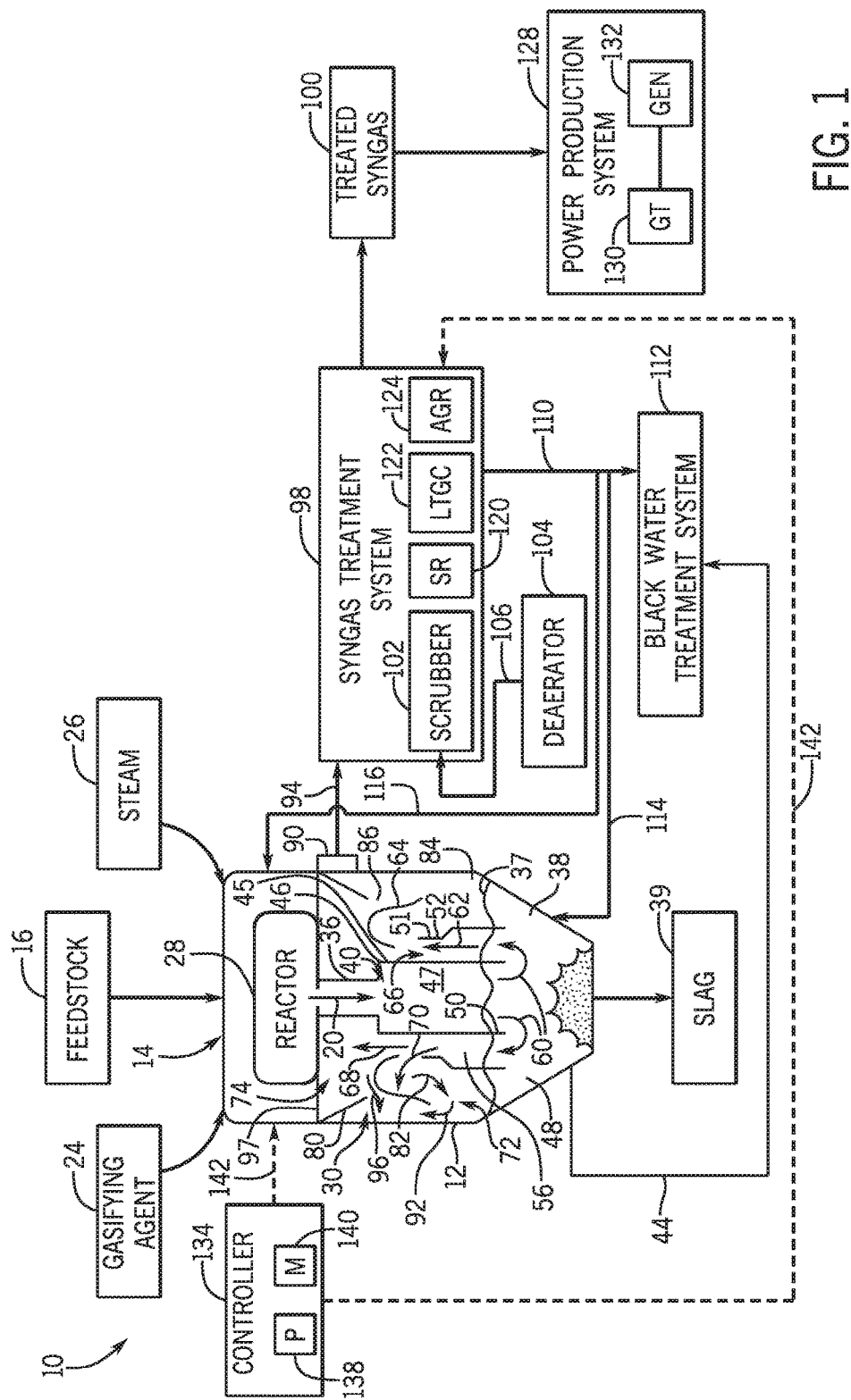
FIG. 1 is a block diagram of an embodiment of a gasification system including a gasification vessel having a draft tube positioned in a quench chamber, whereby the draft tube includes an annular baffle that circumferentially surrounds at least a portion of draft tube.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include a gasification system including a quench chamber designed to remove entrained liquid or moisture (e.g., quench liquid such as water) from a syngas generated in a gasification system. Generally, during gasification, a fuel source or feedstock undergoes partial oxidation in a gasifier to produce a syngas. The resultant syngas exits the gasifier and enters the quench chamber at a high temperature and a high pressure. Accordingly, the syngas may be cooled to a desired temperature. Cooling of the syngas may also facilitate removal of gasification by-products that may be mixed with the syngas exiting the gasifier. The quench chamber may use a quench liquid (e.g., water) to cool the syngas, which may increase a moisture content of the syngas due to water vapor from evaporation of the quench liquid and entrainment of the quench liquid. For example, hot syngas from the gasifier is directed toward a quench pool having the quench liquid and located downstream of the gasifier the quench liquid cools the syngas. The hot syngas contacts the quench liquid, thereby wetting and scrubbing of the hot syngas and associated by-products of gasification (e.g., slag). As the hot syngas contacts the quench liquid, a portion of the quench liquid may evaporate due, in part, to the temperature of the hot syngas to form water vapor that may enter the cooled syngas. Additionally, the quench chamber may include a draft tube configured such that drag forces acting on the quench liquid by the syngas as a result of a flow velocity of the syngas entrain sufficient quench liquid in the syngas producing a three-phase gas-vapor-liquid flow. Therefore, the quench chamber may include certain features that may facilitate removal of the entrained quench liquid from the cooled syngas before the syngas is directed to downstream process (e.g., a syngas treatment, power production, etc.). In certain embodiments, the quench chamber may include features that may split a flow of the cooled syngas through the quench chamber before the cooled syngas exits the draft tube (e.g., upstream of a draft tube outlet) such that a first portion of the cooled syngas flows in one direction and a second portion of the cooled syngas flows in a second direction different from the first direction through the draft tube. By splitting the flow of the cooled syngas through the quench chamber and changing the flow direction of at least a portion of the cooled syngas, the momentum of the entrained quench liquid may be decreased. As such, at least a portion of the entrained quench liquid may be separated from the cooled syngas.

Additionally, splitting the flow of the cooled syngas passing through the draft tube may decrease a flow velocity of at least a portion of the cooled syngas, which may increase a residence time of the cooled syngas in the quench chamber and may facilitate removal of the entrained quench liquid from the cooled syngas. The decrease in the flow velocity of the cooled syngas may decrease the drag forces acting on the entrained quench liquid by the syngas. The decrease in the drag forces acting on the entrained quench liquid by the cooled syngas may allow the entrained quench liquid to separate from the cooled syngas, thereby generating a syngas having a low liquid water content, such as between approximately 75% and 99% less entrained quench liquid compared to the cooled syngas flowing through the draft tube.

Moreover, the split flow path of the cooled syngas passing from the draft tube may increase a length of the flow path of the cooled syngas and, therefore, increase the residence time of the cooled syngas within the quench chamber. For example, the flow path of the cooled syngas may be more tortuous compared to a quench chamber that does not split the flow of the cooled syngas. The tortuous flow path of the cooled syngas through the quench chamber may increase the residence time of the cooled syngas, thereby allowing the cooled syngas to remain in the quench chamber for a desirable amount of time to facilitate removal of the entrained quench liquid from the cooled syngas.

The quench chamber includes a dip tube upstream of the draft tube that directs the hot syngas toward a pool of the quench liquid used to cool the syngas. As the hot syngas impinges on the pool of the quench liquid, the flow velocity of the syngas applies drag forces on at least a portion of the quench liquid, causing entrainment of the quench liquid with the syngas (e.g., a three-phase vapor-gas-liquid flow) and generating a partially cooled syngas. Therefore, after flowing through the dip tube, the hot syngas impinges on the quench liquid before flowing into the draft tube. The draft tube is positioned circumferentially around the dip tube such that the partially cooled syngas (e.g., the three-phase vapor-gas-liquid mixture) flows into the draft tube in a flow direction (e.g., upward direction) that is substantially opposite a flow direction (e.g., downward direction) of the syngas flowing through the dip tube. For example, the partially cooled syngas flows into the draft tube in an upward direction and toward a syngas outlet. The upward flow may enable the syngas to draw copious quantities of quench liquid as it flows into the annulus between the draft tube and the dip tube, thereby increasing the contact time between the syngas and the quench liquid, and consequently the effectiveness of the quenching operation.

The draft tube may improve the effectiveness of the contact between the syngas and the quench liquid. However, the contact between the syngas and the quench liquid may result in high levels of entrained quench liquid in the syngas exiting the annular space between the dip tube and the draft tube. The entrained quench liquid may be difficult to separate from the syngas before it reaches an outlet of the quench chamber (e.g., a quench exit nozzle). Accordingly, it may be difficult to maintain a desirable amount of the quench liquid in the quench chamber that may be required for the quenching process and/or any other downstream processes. However, splitting the flow of the partially cooled syngas adjacent the outlet of draft tube may decrease a flow velocity of the partially cooled syngas, which may also decrease the drag forces acting on the entrained quench liquid due to the upward flow direction of the partially cooled syngas and the momentum of the entrained quench liquid. The decreased flow velocity of the partially cooled syngas may also facilitate removal of the entrained quench liquid by increasing an amount of time the partially cooled syngas is within quench chamber before exiting through the syngas outlet. Without the disclosed embodiment, a flow velocity and residence time of the partially cooled syngas through the quench chamber may be such that the entrained quench liquid may not be adequately removed from the partially cooled syngas before a cooled syngas exits the syngas outlet. Therefore, it may be desirable to include skimming baffles (e.g., airfoils, shear plates) at an exit of the draft tube that may split the flow of the partially cooled syngas through the quench chamber to decrease a flow velocity and redirect a flow of the partially cooled syngas, which may facilitate removal of the entrained quench liquid from the partially cooled syngas and allow effective cooling of the partially cooled syngas to generate the cooled syngas. For example, the skimming baffles may serve as shear plates to remove a substantial portion of the entrained quench liquid from the partially cooled syngas. Accordingly, provided herein is a quench chamber that includes one or more skimming baffles that split a flow of the partially cooled syngas and decrease a flow velocity, redirect at least a portion of the partially cooled syngas, and use shearing surfaces to allow efficient removal of the quench liquid entrained in the cooled syngas.

FIG. 1 is a schematic diagram of an embodiment of a gasification system 10 configured to separate a cooling fluid (e.g., quench liquid) from syngas generated in the gasification system 10. As shown in FIG. 1, the gasification system 10 may include a gasification vessel 12 having a gasifier 14 (e.g., reactor) configured to gasify a feedstock 16 (e.g., fuel) to generate an untreated syngas 20. The feedstock 16 may include coal, petroleum coke, coal and coke blends, biomass, wood-based materials, agricultural wastes, tars, asphalt, gas oil, coke oven gas, fuel gas, natural gas, or other carbon containing materials. The feedstock 16 may be resized or reshaped, for example, by chopping, milling, shredding, pulverizing, briquetting, or pelletizing the feedstock 16 prior to entering the gasifier 14. Additionally, the feedstock 16 may include additives, such as water, to create a feedstock slurry. However, in other embodiments, the feedstock 16 may enter the gasifier 14 as a dry feedstock. The gasifier 14 may be part of an integrated gasification combined cycle (IGCC) power plant or any other variety of plants that use or produce a syngas. The gasifier 14 may be an updraft or downdraft fixed-bed gasifier, a fluidized-bed gasifier, such as a bubbling fluidized-bed gasifier or a circulating fluidized-bed gasifier, a moving bed gasifier, or an entrained flow gasifier.

While in the gasifier 14, the feedstock 16 may be mixed with a gasifying agent 24 (e.g., oxidant, such as, oxygen, oxygen-rich air, or oxygen-reduced air) and steam 26 in a reactor 28 (e.g., reaction chamber or gasification chamber) disposed within the gasifier 14 to produce the untreated syngas 20. In particular, the feedstock 16 may be reacted with a limited amount of the gasifying agent 24 at elevated pressures (e.g., from absolute pressures of approximately 20 bar to 85 bar) and temperatures (e.g., approximately 700° C. to 1600° C.) to partially oxidize the feedstock 16 and generate the untreated syngas 20. Due to chemical reactions between the gasifying agent 24, steam 26, and carbon within the feedstock 16, the untreated syngas 20 may include hydrogen, carbon monoxide, water, ammonia, hydrogen sulfide, methane, and carbon dioxide, as well as other components, such as ash, sulfur, nitrogen, and chloride, present in the carbonaceous fuel. In addition, the untreated syngas 20 may include unconverted carbon (e.g., feedstock that did not participate in gasification reactions).

The gasifier 14 may also include a quench chamber 30 downstream of the reactor 28. In certain embodiments, the quench chamber 30 may be integral with the gasifier 14. In other embodiments, the quench chamber 30 may be a separate unit from the gasifier 14. The quench chamber 30 may cool and separate the untreated syngas 20 from gasification by-products (e.g., molten slag.). Within the reactor 28, the feedstock 16 may be heated to undergo various conversion processes including pyrolysis and partial oxidation. According to certain embodiments, depending on the feedstock 16 utilized, pyrolysis may occur at temperatures inside the reactor 28 ranging from approximately 150° C. to 700° C., and partial oxidation may occur at temperatures ranging from approximately 1100° C. to approximately 1600° C. These processes may generate a solid, e.g., char, and residue, a liquid, e.g., molten slag, and gases, e.g., carbon monoxide, water, methane, and hydrogen. The quench chamber 30 of the gasifier 14 may receive the untreated syngas 20 and the gasification by-products, as indicated by arrow 20, as they leave the reactor 28 through a bottom end 36 (or throat) of the reactor 28. In general, the quench chamber 30 may be used to quench and thereby reduce the temperature of the untreated syngas 20 and gasification by-products, and to disengage a portion of the gasification by-products (e.g., molten slag) from the untreated syngas 20. In certain embodiments, a quench liquid 38 (e.g., water) may flow from adjacent the bottom end 36 and fill the quench chamber 30 to facilitate cooling of the untreated syngas 20 and gasification by-products (e.g., molten slag). For example, as the untreated syngas 20 and gasification by-products flow through the bottom end 36 (e.g., arrow 20), at least a portion of the quench liquid 38 within the quench chamber 30 may vaporize by extracting heat from the untreated syngas 20 and molten slag 39, resulting in cooling of the untreated syngas 20 and the cooling and solidifying of molten slag to form solid slag 39. In certain embodiments, the quench chamber 30 may include a quench ring (e.g., see FIG. 2, quench ring 170) at the bottom end 36 (e.g., at an entrance 40 of the quench chamber 30) configured to provide the quench liquid 38 to the quench chamber 30. The slag 39 may accumulate in a bottom of a quench bath 48, after which the slag 39 may be removed and directed to downstream processing systems configured to dispose of the slag 39 and recover a substantial portion (e.g., between approximately 90% and approximately 99%) of the liquid from the slag 39. Similarly, fine ash and unconverted carbon separated from syngas 20 may be withdrawn from quench chamber 30 as a black water stream 44 and be sent to black water treatment system 112 for further handling.

The quench system 30 also includes a dip tube 46 (e.g., annular dip tube) extending from the bottom end 36 of the reactor 28 toward the bottom of the quench bath 48 of the quench chamber 30 that conducts the hot untreated syngas 20 and gasification byproducts into the quench liquid 38. The dip tube 46 may take any form suitable for facilitating cooling of the untreated syngas 20 and/or for directing the untreated syngas 20 toward the quench bath 48. For example, the dip tube 46 (e.g., annular dip tube) may have a wall 45 (e.g., annular wall) extending circumferentially about an interior chamber or passage 47. In certain embodiments, a lower end 50 of the dip tube 46 may extend into the quench liquid 38 below a surface level 37 of the quench liquid 38. Accordingly, the dip tube 46 may route the untreated syngas 20 through the interior 47 (e.g., passage or chamber) toward the quench liquid 38, such that the untreated syngas 20 impinges on and flows through (e.g., bubbles through) the quench liquid 38 around the lower end 50 of the dip tube 46 as indicated by arrow 60. The quench liquid 38 cools the untreated syngas 20 and becomes at least partially entrained in the untreated syngas 20, thereby producing a partially cooled syngas 20 with entrained quench liquid 38 (e.g., three-phase vapor-liquid-gas flow) as indicated by arrow 62. The entrained quench liquid 38 may increase the moisture content of the partially cooled syngas 62, and thus it may be desirable to separate at least a portion of the entrained quench liquid 38 from the partially cooled syngas 62.

The quench chamber 30 includes a draft tube 52 disposed about (e.g., coaxial with) the dip tube 46 and configured to improve contact between the untreated syngas 20 and the quench liquid 38 and facilitate entrainment of the quench liquid 38 by the untreated syngas 20. For example, the draft tube 52 (e.g., annular draft tube) may have a wall 51 (e.g., annular wall) extending circumferentially about the wall 45 of the dip tube 46, thereby defining an intermediate chamber or passage (e.g., annular passage or annulus 56). In operation, after cooling in the quench liquid 38, the untreated syngas 20 (e.g., partially cooled syngas 62) flows away from the quench bath 48 upwardly through the annulus 56 between the dip tube 46 and the draft tube 52, as shown by arrows 60 and 62. A geometry of the draft tube 52 adjacent to the lower end 50 of the dip tube 46 enables the untreated syngas 20 to entrain a sufficient amount of the quench liquid 38 as the untreated syngas 20 flows upwardly into the annulus 56, thereby generating the partially cooled syngas 62. The partially cooled syngas 62 flows through the draft tube 52 in a direction that is substantially opposite a direction of the untreated syngas 20 flowing through the dip tube 46. The directional change in the flow of the partially cooled syngas 62 through the annulus 56 may facilitate entrainment of the quench liquid 38 by the partially cooled syngas 62 to facilitate further cooling of the partially cooled syngas 62. For example, as the partially cooled syngas 62 flows upward through the annulus 56, the effective contact time between the partially cooled syngas 62 and the quench liquid 38 may be increased such that a desirable amount of the quench liquid 38 may be entrained within the partially cooled syngas 62.

In certain embodiments, the quench chamber 30 may include features that may facilitate removal of the entrained quench liquid 38 from the partially cooled syngas 62. For example, as discussed in further detail below, a skimming baffle 64 (e.g., inner annular baffle or airfoil that gradually turns from an upward direction to a downward direction) may split a flow of the partially cooled syngas 62 at a draft tube outlet 66 of the draft tube 52 into an inner annulus syngas stream 68 and an outer annulus syngas stream 70. Splitting the flow of the partially cooled syngas 62 into the streams 68, 70 may break momentum of the entrained quench liquid 38 in the partially cooled syngas 62 and allow the entrained quench liquid 38 to coalesce, resulting in separation of the partially cooled syngas 62 from the entrained quench liquid 38. Therefore, the skimming baffle 64 may serve as shear plates in the quench chamber 30 to remove a substantial portion of the entrained quench liquid 38 from the partially cooled syngas 62 before the partially cooled syngas 62 flows into a vapor space 72 (e.g., annular space) circumferentially surrounding the wall 51 of the draft tube 52. Additionally, the skimming baffle 64 may redistribute the flow of the partially cooled syngas 62, which reduces the average velocity, expands flow paths, and increases the effective residence time of the partially cooled syngas 62 within the quench chamber 30.

Additionally, the skimming baffle 64 is configured to change a flow direction of the outer annulus syngas stream 70 relative to the inner annulus syngas stream 68. For example, the skimming baffle 64 may have a configuration (e.g., a bend, turn, or curve) that may direct the outer annulus syngas stream 70 from an upward direction to a downward direction into the vapor space 72 toward the bottom of the quench bath 48, while the inner annulus syngas stream 68 may continue flowing in the upward direction into an annular space 74 defined by a baffle 80 (e.g., outer annular baffle) that circumferentially surrounds the bottom end 36 of the reactor 28 and at least a portion of the dip tube 46. The change in the flow direction of the outer annulus syngas stream 70 (e.g., from an upward direction to a downward direction) may decrease a flow velocity of the outer annulus syngas stream 70 and, consequently, decrease the drag forces acting on the entrained quench liquid 38 by the partially cooled syngas 62. As such, at least a portion of the entrained quench liquid 38 may be separated from the partially cooled syngas 62 before the partially cooled syngas 62 flows into the vapor space 72 of the quench chamber 30. Moreover, a momentum of the entrained quench liquid 38 may cause the entrained quench liquid 38 to impinge on the skimming baffle 64, resulting in separation of the entrained quench liquid 38 from the partially cooled syngas 62. Droplets of the separated entrained quench liquid 38 may collect on the skimming baffle 64 and flow downwardly on a surface of the skimming baffle 64 toward the quench bath 48. In this way, the skimming baffle 64 removes the entrained quench liquid 38 from the partially cooled syngas 62 to generate a first cooled syngas 82 having a reduced content of the entrained quench liquid 38 (e.g., with a liquid water content of less than approximately 5, 10, 15, 20, or 25 percent) compared to the partially cooled syngas 62. As discussed in further detail below, the skimming baffle 64 may include certain features (e.g., see FIG. 3; gutter 224) that may collect the entrained quench liquid 38 separated from the outer annulus syngas stream 70 to mitigate re-entrainment of the separated quench liquid 38.

Moreover, in addition to decreasing the flow velocity of the outer annulus syngas stream 70, the skimming baffle 64 may change a flow direction of the first cooled syngas 82 and facilitate mixing of the quench vapor and the untreated syngas 20 to efficiently cool the partially cooled syngas 62. The skimming baffle 64 may direct the first cooled syngas 82 into a bottom region 84 of the vapor space 72 (e.g., annular space between the draft tube outlet 66 and the surface level 37 of the quench liquid 38). Directing the first cooled syngas 82 into the bottom region 84 of the vapor space 72 may increase a residence time of the second cooled syngas 82 within the vapor space 72. For example, without the disclosed embodiments, the partially cooled syngas 62 may exit the draft tube 52 through the draft tube outlet 66 and flow into an upper region 86 of the vapor space 72 (e.g., annular space between the draft tube outlet 66 and the baffle 80) before exiting the quench chamber 30 through a syngas outlet 90. In certain embodiments, the syngas outlet 90 is positioned adjacent to the upper region 86 of the vapor space 72. Therefore, without the disclosed embodiments, a residence time of the partially cooled syngas 62 within the quench chamber 30 (e.g., in the vapor space 72) may not be sufficient for removal of a desirable amount of the entrained quench liquid 38 (e.g., liquid and/or vapor) that may remain in the partially cooled syngas 62 before the partially cooled syngas 62 exits the syngas outlet 90. However, it is now recognized that by positioning the skimming baffle 64 at the draft tube outlet 66, the partially cooled syngas 62 (e.g., the outer annulus syngas stream 70) may be directed into the bottom region 84 of the vapor space 72, which would otherwise not be utilized. Moreover, the skimming baffle 64 may create a longer and more tortuous flow path for the partially cooled syngas 62 compared to quench chambers that do not include the skimming baffles 64. Therefore, the residence time of the first cooled syngas 82 in the vapor space 72 may be increased compared to embodiments that do not include the skimming baffle 64.

Furthermore, the bottom region 84 may be cooler compared to the upper region 86 of the vapor space 72 due, in part, to the proximity of the bottom region 84 to the bottom of the quench bath 48. Accordingly, directing the first cooled syngas 82 towards the bottom region 84 may further cool the first cooled syngas 82, which may allow additional entrained quench liquid 38 (e.g., liquid and/or vapor) to be separated from the first cooled syngas 82. In this way, the quench chamber 30 may remove a desirable amount of the entrained quench liquid 38 (e.g., between approximately 95% and approximately 99%) from the partially cooled syngas 62 to generate a first portion 92 of a second cooled syngas 94 having less than approximately 1, 2, 3, 4, or 5 percent entrained quench liquid 38.

As discussed above, the skimming baffle 64 splits the flow of the partially cooled syngas 62 into the inner annulus syngas stream 68 (e.g., flow path between the wall 45 of the dip tube 46 and an outer wall of the skimming baffle 64) and the outer annulus syngas stream 70 (e.g., between the wall 51 of the draft tube and an inner wall of the skimming baffle 64). In contrast to the outer annulus syngas stream 70, the flow direction of the inner annulus syngas stream 68 may continue in an upward direction toward the annular space 74. Directing the inner annulus syngas stream 68 into the annular space 74 may facilitate cooling of a portion of the wall 45 of the dip tube 46 (e.g., the portion of the wall 45 positioned above the draft tube outlet 66 and adjacent to the bottom end 36) and other portions of quench chamber 30, such as the wall 97 separating reaction chamber 28 from quench chamber 30. The skimming baffle 64 may restrict a flow of the inner annulus syngas stream 68 due to the narrowing flow path between the outer wall of the skimming baffle 64 and the wall 45 of the dip tube 46.

While in the annular space 74, the inner annulus syngas stream 68 radially expands to fill the annular space 74. Expansion of the inner annulus syngas stream 68 decreases a flow velocity of the inner annulus syngas stream 68, which decreases the drag forces acting on the entrained quench liquid 38 by the partially cooled syngas 62. As such, the inner annulus syngas stream 68 may no longer have a sufficient flow velocity to carry as much entrained quench liquid 38. Consequently, at least a portion of entrained quench liquid 38 may be separated from the partially cooled syngas 62 to generate a second portion 96 of the second cooled syngas 94. The second portion 96 of the second cooled syngas 94 may be mixed with the first portion 92 of the second cooled syngas 94 in the vapor space 72.

Following removal of the entrained quench liquid 38, the second cooled syngas 94 may exit the gasification vessel 12 via the syngas outlet 90 and may flow into a syngas treatment system 98. The syngas treatment system 98 is configured to remove residual particulates (e.g., slag, soot, unconverted carbon, etc.) and moisture from the second cooled syngas 94 and to generate treated syngas 100. For example, the syngas treatment system 98 may include a scrubber 102 that utilizes water to remove the residual particulates and other components from the second cooled syngas 94 that may have been carried over from the gasification vessel 12. The scrubber 102 may receive fluid (e.g., deaerated water) from a deaerator 104 via scrubber line 106. The fluid from the deaerator 104 may facilitate removal of the residual particulates from the second cooled syngas 94 and produce a second stream of black water 110 (e.g., mixture of water and removed residual particulates). In certain embodiments, the black water 110 may be directed to a black water treatment system 112 for additional processing (e.g., recovery of unconverted carbon, disposal, etc.). In other embodiments, the black water 110 may be circulated to the gasification vessel 12. For example, as indicated by line 114, at least a portion of the black water 110 may be directed to the quench chamber 30 (e.g., the dip tube 46 via a quench ring and/or the bottom of the quench bath 48) and used to cool the untreated syngas 20. In one embodiment, a portion of the black water 110 may be directed to the reactor 28, as indicated by line 116. The reactor 28 may gasify the unreacted carbon in the black water 110, thereby increasing the efficiency of the gasification system 10 compared to gasification system that do not recover and gasify unconverted carbon.

In addition to the scrubber 102, the syngas treatment system 98 may also include other components, such as a shift reactor 120 to increase the hydrogen content of the syngas, a low temperature gas cooling (LTGC) train 122 to cool the syngas, and/or an acid gas removal (AGR) unit 124, to remove any other remaining undesirable impurities (e.g., acid gases, etc.) from the second cooled syngas 94 to generate the treated syngas 100. The treated syngas 100 may then be used for a variety of processes such as chemical processing or power generation (e.g., gas turbine, etc.). For example, the treated syngas 100 may be directed to a power production system 128 (e.g., gas turbine 130 drivingly coupled to generator 132).

The gasification system 10 may also include a controller 134 to govern operation of the gasification system 10. The controller 134 may independently control operation of the gasification system 10 by electrically communicating with sensors, control valves, and pumps or other flow adjusting features throughout the gasification system 10. The controller 134 may include a distributed control system (DCS) or any computer-based workstation that is fully or partially automated. For example, the controller 134 can be any device employing a general purpose or an application-specific processor 138, both of which may generally include memory circuitry 140 for storing instructions such as gasification parameters (e.g., the gasification conditions of the feedstock 16). The processor 138 may include one or more processing devices, and the memory circuitry 140 may include one or more tangible, non-transitory, machine-readable media collectively storing instructions executable by the processor to control actions described herein.

In one embodiment, the controller 134 may operate control devices (e.g., valves, pumps, etc.) to control amounts and/or flows between the different system components. It should be noted that there may be valves throughout the gasification system 10 used to adjust different amounts and/or flows between the system components. For example, the controller 134 may also govern operation of valves to control an amount or adjust a flow of the feedstock 16, the gasifying agent 24, and the steam 26 that enters the gasifier 14. In certain embodiments, the control device may be part of a weighing or metering system that measures the amount of the feedstock 16 before it enters the gasifier 14. Additionally, the controller 134 may adjust the amount of the quench liquid 38 supplied to the quench chamber 30 to maintain a quench vaporization level suitable for cooling the untreated syngas 20.

In certain embodiments, the controller 134 may use information provided via input signals to execute instructions or code contained on a machine-readable or computer-readable storage medium 140 and generate one or more output signals 142 to the various control devices (e.g., valves and pumps) to control a flow of fluids (e.g., the feedstock 16, gasifying agent 24, steam 26, quench liquid 38, partially cooled syngas 62, 94 black water 110, treated syngas 100, or any other suitable fluid throughout the gasification system 10.

Figure 2:
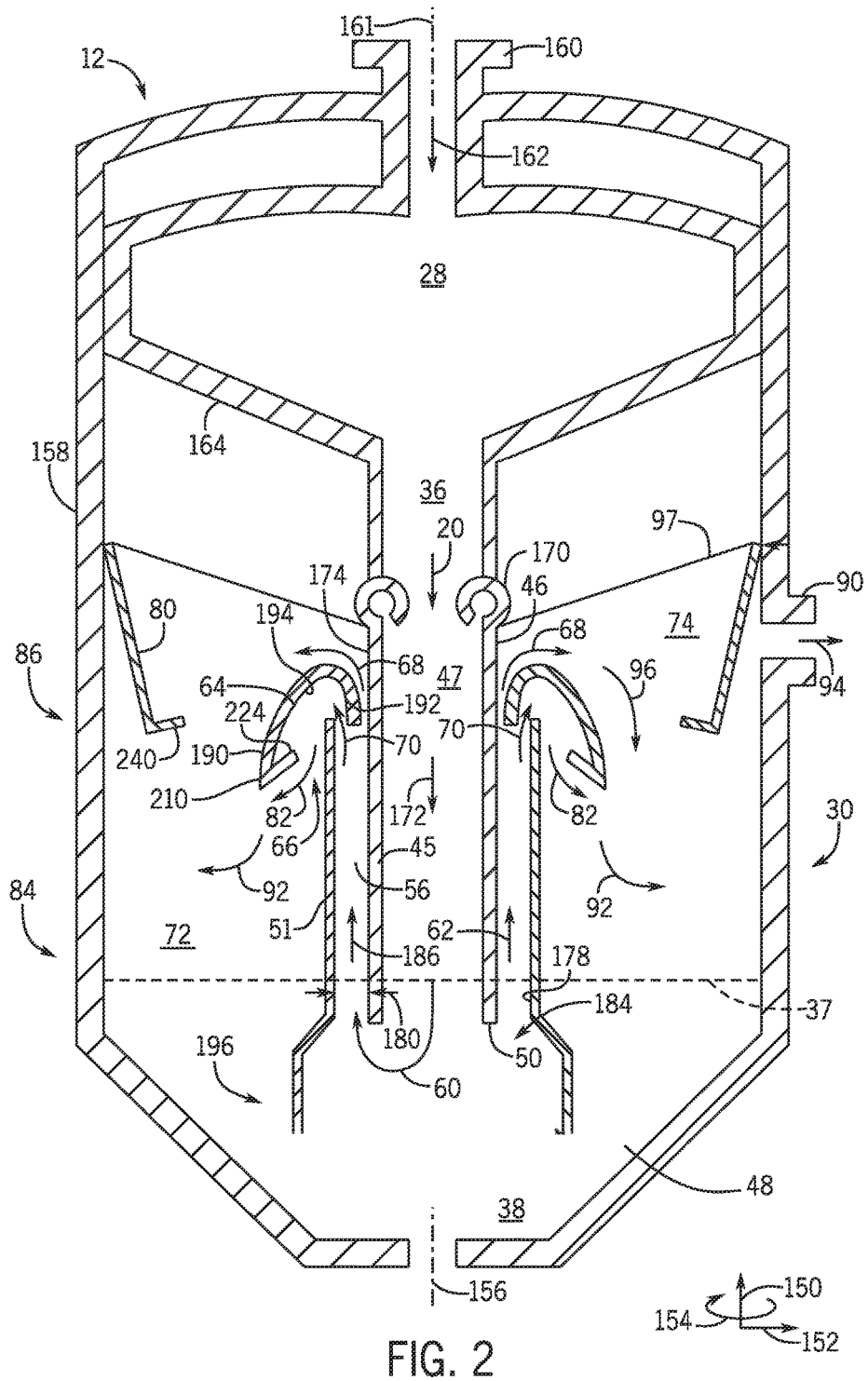
FIG. 2 is a cross-sectional view of an embodiment of the gasification vessel of FIG. 1, whereby the annular baffle is positioned at an outlet of the draft tube.

As discussed above, the gasification system 10 may be configured to remove entrained liquid 38 (e.g., water) from the partially cooled syngas 62. For example, the quench chamber 30 may include one or more features that facilitate removal of entrained liquid 38 from the partially cooled syngas 62. Turning now to FIG. 2, a cross-sectional view of an embodiment of the gasification vessel 12 is illustrated.

The gasification vessel 12 may have an axial axis or direction 150, a radial axis or direction 152 away from axis 150, and a circumferential axis or direction 154 around axis 150. For example, the axis 150 corresponds to a longitudinal centerline 156 or lengthwise direction, the axis 152 corresponds to a crosswise or radial direction relative to the longitudinal centerline 156, and the axis 154 corresponds to the circumferential direction about the longitudinal centerline 156. As noted above, the gasification vessel 12 includes the reactor 28 and the quench chamber 30 in a coaxial arrangement (e.g., along axial axis 150). The gasification vessel 12 includes an enclosure 158, also referred to as a shell (e.g., an annular shell), that functions as a housing or outer casing for the gasification vessel 12 (e.g., an annular vessel). The gasification vessel 12 may also include a reactor floor 97 that separates the reaction chamber 28 from the quench chamber 30 and incorporates bottom end 36 thereby enabling the products from reactor 28 to flow into quench chamber 30. The gasification vessel 12 may also include features that facilitate coupling of the gasification vessel 12 to a source for the feedstock 16 used to generate the syngas (e.g., untreated syngas 20 and treated syngas 100). For example, the gasification vessel 12 may include an inlet 160 (e.g., an axial port at the apex of the gasification vessel 12) configured to receive a feed injector that supplies the gasifier 14 (e.g., reactor 28) with the feedstock 16, as indicated by arrow 162. In the illustrated embodiment, the inlet 160 and thus the feed injector is disposed along a central axis 161 of the gasification vessel 12. However, in some embodiments, one or more inlets 160 and associated feed injectors may be coupled to the gasification vessel 12 at an offset distance from the central axis 161, such as along a side wall and/or top wall of the enclosure 158. In certain embodiments, the injector may supply the gasifier 14 with the steam 26, gasifying agent 24 (e.g., oxidant), or any other suitable fluid to facilitate gasification of the feedstock 16 within the gasifier 14.

The gasifier 14 may also include a protective barrier 164. As discussed above, the gasifier 14 is configured to partially oxidize the feedstock 16 within the reactor 28 at temperatures in excess of approximately 700° C. and pressures of at least approximately 20 bar. The protective barrier 164 may improve the durability of the gasifier 14 by decreasing temperature and pressure effects associated with gasification of the feedstock 16. Accordingly, the protective barrier 164 may define the reactor 28 and the bottom end 36, and may be supported by in part by the reactor floor 97 (e.g., reactor wall). The protective barrier 164 may act as a physical barrier, a thermal barrier, a chemical barrier, or any combination thereof. Examples of materials that may be used for the protective barrier 164 include, but are not limited to, refractory materials, refractory metals, non-metallic materials, clays, ceramics, cements, and oxides of aluminum, silicon, magnesium, and calcium. In addition, the materials used for the protective barrier 164 may be bricks, castable, coatings, or any other suitable material, or combination thereof. Furthermore, in certain embodiments the protective barrier 164 may include a cooling wall or a surface wetting film for additional vessel protection. In certain embodiments, the protective barrier 164 may also coat a quench ring 170.

As discussed above, the dip tube 46 receives the untreated syngas 20 from the reactor 28 and directs the untreated syngas 20 into the quench liquid 38 in a first direction 172 (e.g., downward direction) toward the bottom of the quench bath 48 to generate the partially cooled syngas 62. Following cooling of the untreated syngas 20, the partially cooled syngas 62 is directed into the annulus 56 of the draft tube 52 that is formed between the wall 45 (e.g., an outer wall surface 174) of the dip tube 46 and the wall 51 (e.g., an inner wall surface 178) of the draft tube 52, where the partially cooled syngas 62 may be split into the inner and outer annulus syngas streams 68, 70 to facilitate removal of the entrained quench liquid 38 downstream of the draft tube outlet 66.

A portion of the draft tube 52 includes a first inner dimension 180 (e.g., radial gap between walls 45 and 51). In certain embodiments, the first inner dimension 180 may be constant (e.g., non-varying) between a syngas inlet end 184 (e.g., adjacent to the lower end 50 of the dip tube 46) and the draft tube outlet 66, as illustrated in FIG. 2. However, in other embodiments, the first inner dimension 180 may vary between the syngas inlet end 184 and the draft tube outlet 66. For example, the first inner dimension 180 of at least a portion of the annulus 56 may increase axially 150 in a second direction 186 (e.g., upward direction) that is substantially opposite the first direction 172. For example, the first inner dimension 180 of the annulus 56 (or diameter of the draft tube 52) may increase toward the draft tube outlet 66, such that a widest dimension 180 of the annulus 56 (or widest diameter of the draft tube 52) may be located at the draft tube outlet 66. Therefore, the annulus 56 between the dip tube 46 and the draft tube 52 may have a tapered or diverging geometry (e.g., a diverging annular flow path or progressively increasing annular cross-section). Similarly, the draft tube 52 may have a tapered or diverging configuration (e.g., a conical wall structure or progressively expanding annular wall structure), such that the draft tube 52 is broader at the draft tube outlet 66 relative to the syngas inlet end 184. In other words, the draft tube 52 may be described as a diverging annular draft tube 52 with an annular wall 51, 178, which gradually diverges away from the wall 45, 174 of the dip tube 46 to create a diverging annular passage or annulus 56.

The tapered configuration of the annulus 56 may increase a flow area of the partially cooled syngas 62 through the draft tube 52, which may decrease a velocity of the partially cooled syngas 62 and facilitate removal of the entrained quench liquid 38. For example, the tapered configuration may cause the partially cooled syngas 62 to radially 152 expand (e.g., diverge away from a central axis) to fill the annulus 56 of the draft tube 52. As the partially cooled syngas 62 diffuses through the annulus 56, the velocity of the partially cooled syngas 62 decreases and a residence time of the partially cooled syngas 62 within the draft tube 52 may be increased. Accordingly, the drag forces applied by the partially cooled syngas 62 on the entrained quench liquid 38 may be decreased, thereby facilitating separation of the entrained quench liquid 38 from the partially cooled syngas 62.

As discussed above, the flow of the partially cooled syngas 62 may be split into the annulus syngas steams 68, 70 (or fluid flow paths) upstream of the vapor space 72 and the annular space 74. For example, the skimming baffle 64 may be positioned at the draft tube outlet 66 such that as the partially cooled syngas 62 exits the draft tube outlet 66, a skimming baffle wall 190 (e.g., annular wall) splits the flow of the partially cooled syngas 62 into the annulus syngas streams 68, 70 (or fluid flow paths). As illustrated, the skimming baffle wall 190 includes an arc 192 (e.g., a bend, turn, or curved wall portion), which may turn at least 45 to 270, 50 to 225, 75 to 180, or 90 to 160 degrees. For example, the arc 192 may turn at least greater than or equal to approximately 45, 60, 75, 90, 120, 150, or 180 degrees. The arc 192 may extend on opposite exterior and interior surfaces 194, 210. The arc 192 on the interior surface 194 may redirect the flow of the outer annulus syngas stream 70 from the second direction 186 (e.g., upward direction) to a direction substantially similar to the first direction 172 (e.g., the downward direction). By splitting and redirecting the flow of the partially cooled syngas 62, a velocity of the partially cooled syngas 62 through the annular space 74 may be decreased and a flow of at least a portion of the partially cooled syngas 62 entering the bottom region 84 of the vapor space 72 may be increased. Therefore, the effective residence time of the cooled syngas within the vapor space 72 of the quench chamber 30 may be increased, thereby improving separation of the entrained quench liquid 38 from the cooled syngas 82 before the cooled syngas exits the gasification vessel 12 through the syngas outlet 90.

Moreover, as the skimming baffle 64 redirects the partially cooled syngas 62, the turn resulting from the arc 192 on the interior surface 194 may facilitate the entrained quench liquid 38 to drop out of the outer annulus syngas stream 70. For example, the heavier droplets of the entrained quench liquid 38 may be unable to make the turn created by the arc 192 due to momentum compared to the untreated syngas 20 in the outer annulus syngas stream 70. As such, the droplets of the entrained quench fluid 38 may come out of the outer annulus syngas stream 70, while the untreated syngas 20 may continue to move through the turn and towards the vapor space 72, thereby generating the first cooled syngas 82.

In operation, the untreated syngas 20 flows downwardly (e.g., downward first flow direction 172) through the dip tube 46, into the quench liquid 38, around the lower end 50 of the dip tube 46 as indicated by arrow 60, into a bottom section 196 of the draft tube 52, and upwardly into the annulus 56 between the dip tube 46 and the draft tube 52. In this manner, the untreated syngas 20 is cooled by and entrains at least some of the quench liquid 38, thereby directing the partially cooled syngas 62 with entrained quench liquid 38 into the draft tube 52. In addition to factors like syngas composition, temperature and pressure, and temperature of the quench liquid 38, the flow velocity of the syngas 20, 62 may decrease, increase or remain substantially the same as it flows from the dip tube 46 into the draft tube 52 based on the ratio (e.g., lesser than, greater than, or equal to 1) of cross-sectional flow area of the dip tube 46 relative to the cross-sectional flow area of the annulus 56 between the dip tube 46 and the draft tube 52. The configuration of the draft tube 52 improves the effective contact time between the syngas 20 and the quench liquid 38 such that the syngas 20 entrains a substantial portion of the quench liquid 38. In this way, the syngas 20 may be cooled. Once inside the annulus 56, the partially cooled syngas 62 flows upwardly (e.g., upward second flow direction 186) between the wall 45 of the dip tube 46 and the wall 51 of the draft tube 52. Within the annulus 56, the skimming baffle 64 splits and redirects the flow of the partially cooled syngas 62 adjacent the draft tube outlet 66. As noted above, splitting and redirecting the flow of the partially cooled syngas 62 may help to reduce a flow of the partially cooled syngas 62 into the annular space 74 and increase a flow of at least a portion of the partially cooled syngas 62 into the bottom region 84 of the vapor space 72, thereby increasing the effective residence time of the partially cooled syngas 62 in the quench chamber 30 to allow more time for the entrained quench liquid 38 to drop out of the flow of partially cooled syngas 62.

Figure 3:
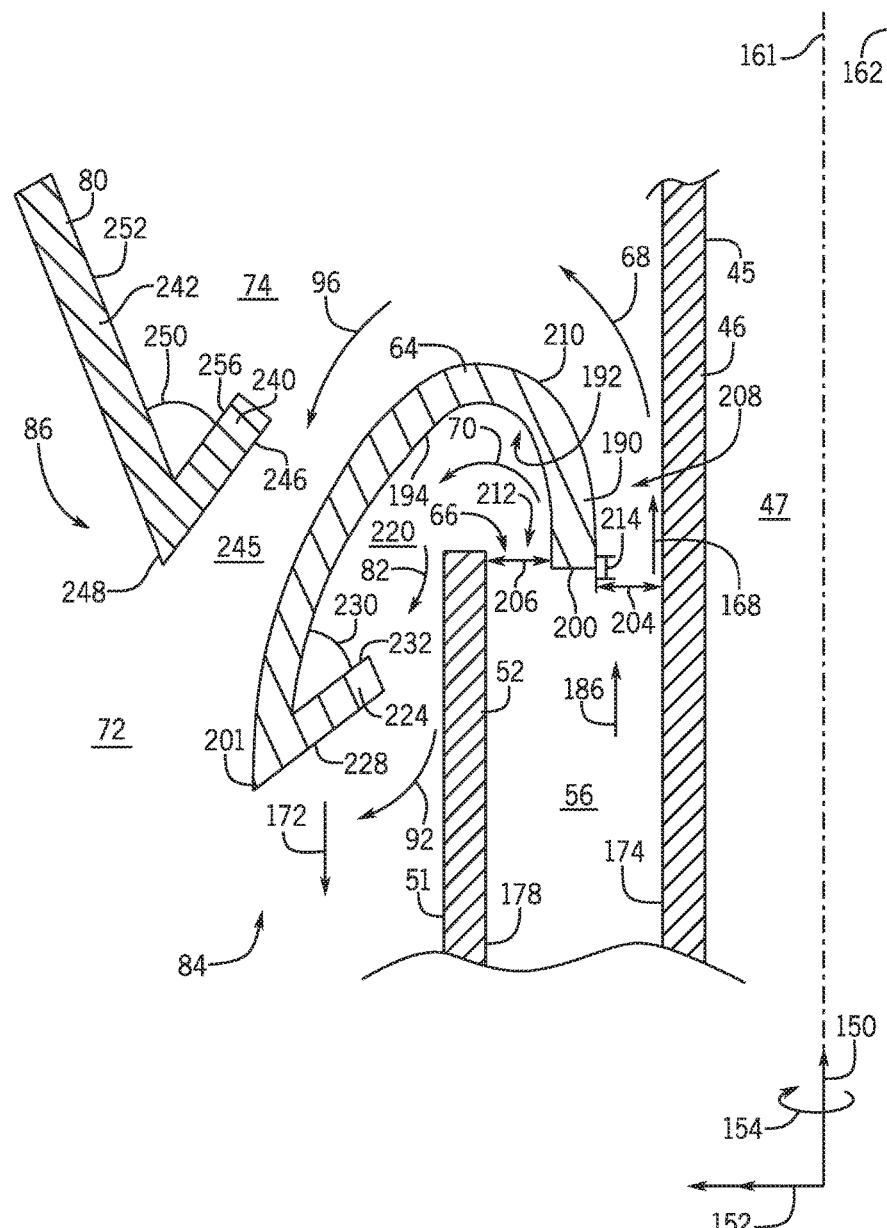
FIG. 3 is a partial cross-sectional view of an embodiment of the gasification vessel of FIG. 2, whereby the annular baffle extends into an annulus between the draft tube and a dip tube such that a flow of syngas through the draft tube is split as the syngas exits the draft tube.

Turning now to FIG. 3, a portion of the gasification vessel 12 having the skimming baffle 64 positioned at the draft tube outlet 66 is illustrated. In the illustrated embodiment, the skimming baffle 64 includes a first skimming baffle end 200 (e.g., upstream end) positioned radially 152 away from the walls 45, 51. For example, the first skimming baffle end 200 may be positioned a first radial distance 204 away from the wall 45, 174 of the dip tube 46 and a second radial distance 206 away from the wall 51, 178 of the draft tube 52, such that the first skimming baffle end 200 is within the annulus 56 defined by the walls 45, 174 and 51, 178. The radial distances 204, 206 are such that particulates that may be entrained in the partially cooled syngas 62 may flow through a fluid flow path or passage 208 (e.g., passage defined by exterior surface 210 of the skimming baffle wall 190 and the wall 45, 174 of the dip tube 46) and a fluid flow path or passage 212 (e.g., passage between interior surface 194 of the skimming baffle wall 190 and the wall 51, 178 of the draft tube 52) without accumulating and clogging the passages 208, 212. The passages 208, 212 extend circumferentially about the axis 161, and thus the passages 208, 212 may be annular passages. In one embodiment, the radial distances 204, 206 are substantially equal. In other embodiments, the radial distances 204, 206 are different. For example, the first radial distance 204 may be between approximately 10% and approximately 75% smaller than the second radial distance 206, such as 10%, 15%, 20%, 25%, 30%, 40%, 50%, or 75% smaller than the second radial distance 206. Conversely, in certain embodiments, the second radial distance 206 may be between approximately 10% and approximately 75% smaller than the first radial distance 204, such as 10%, 15%, 20%, 25%, 30%, 40%, 50%, or 75% smaller than the first radial distance 204.

In addition to being radially 152 spaced apart from the walls 45, 174 and 51, 178, at least a portion of the first skimming baffle end 200 axially 150 overlaps with the walls 45, 174 and 51, 178 that define the draft tube outlet 66. For example, in the illustrated embodiment, a portion 214 (e.g., annular end portion) of the skimming baffle wall 190 that is adjacent to the first skimming baffle end 200 axially 150 overlaps with both the walls 45, 174 and 51, 178 of the dip tube 46 and the draft tube 52, respectively. In some embodiments, the upstream end 200 of the skimming baffle wall 190 may be flush (e.g., axially 150 aligned) with or axially downstream of the annulus 56 and the draft tube 52. In each configuration, the first skimming baffle end 200 of the skimming baffle 64 may split the flow of the partially cooled syngas 62 as the partially cooled syngas 62 approaches and/or exits away from the draft tube outlet 66, thereby generating the annulus syngas streams 68, 70 upstream, or downstream, of the draft tube outlet 66. In other embodiments, the upstream end 200 of the skimming baffle wall 190 may be tapered or have any other suitable shape (e.g., sharp-edge) that may facilitate separation of the partially cooled syngas 62 into the inner and outer annulus syngas streams 68, 70. The skimming baffle 64 may also include an axial (e.g., vertical) extension to direct the inner annulus syngas stream 68 in a desired trajectory.

The skimming baffle 64 is configured to direct the flow of the annulus syngas streams 68, 70 in different directions. For example, as discussed above, the skimming baffle 64 may not substantially change a flow direction of the inner annulus syngas stream 68. Therefore, as the inner annulus syngas stream 68 exits the draft tube outlet 66 and flows into the passage 208, the inner annulus syngas stream 68 may continue to flow in the second direction 186 (e.g., upward direction) into the annular space 74. In contrast, the skimming baffle 64 is configured to redirect the flow of the outer annulus syngas stream 70 such that the outer annulus syngas stream 70 diverges from the second flow direction 186. The outer annulus syngas stream 70 may be redirected toward the bottom region 84 of the vapor space 72 rather than the annular space 74. For example, the configuration of the skimming baffle 64 may direct the outer annulus syngas stream 70 such that the outer annulus syngas stream 70 radially 152 diverges away from the flow of the inner annulus syngas stream 68 and flows in the first direction 172 (e.g., downward direction) into the bottom region 84 of the vapor space 72. Accordingly, the skimming baffle wall 190 may be curved (e.g., arcuate) in a manner that a second skimming baffle end 201 extends radially 152 away and axially 150 below the first skimming baffle end 200 of the skimming baffle 64.

The curved skimming baffle wall 190 (e.g., annular wall) defines the arc 192 (e.g., concave surface 194 extending circumferentially about the axis 161) that enables the skimming baffle 64 to redirect the flow of the outer annulus syngas stream 70 from the upward second direction 186 to the downward first direction 172 and toward the bottom region 84 of the vapor space 72. As the outer annulus syngas stream 70 exits the draft tube outlet 66 and flows into an annular passage 220 defined by the concave surface 194 (e.g., arc 192) of the skimming baffle wall 190, the outer annulus syngas stream 70 impinges the concave surface 194. The arcuate-shape of the concave surface 194 is configured to redirect the flow of the outer annulus syngas stream 70 such that the outer annulus syngas stream 70 flows in the first direction 172 and into the bottom region 84 of the vapor space 72 rather than in the second direction 186 and into the annular space 74. Moreover, the changes in flow direction of the outer annulus syngas stream 70 resulting from the arcuate-shape of the concave surface 194 may increase the overall length and tortuous nature of the flow path through the concave portion of the skimming baffle 64. In this way, the effective residence time of the untreated syngas 20 in the quench chamber 30 may be increased, thereby allowing a desirable amount of the entrained quench liquid 38 to be removed from the cooled syngas (e.g., the cooled syngas 62, 82, 96) before the cooled syngas exits the quench chamber 30 through the syngas outlet 90. Moreover, as discussed above, the momentum differences between the entrained quench liquid 38 and the untreated syngas 20 in the outer annulus syngas stream 70 may not allow the droplets of the entrained quench liquid 38 to keep up with the lower density untreated syngas 20 as the concave surface 194 turns the outer annulus syngas stream 70 in the downward direction 172, thereby facilitating separation of the entrained quench liquid 38 and the untreated syngas 20.

In addition to redirecting the flow of the outer annulus syngas stream 70, the skimming baffle 64 serves as a shear plate to facilitate coalescence of the entrained quench liquid 38, thereby separating at least a portion of the entrained quench liquid 38 from the partially cooled syngas 62 in the outer annulus syngas stream 70 to generate the first cooled syngas 82. The first cooled syngas 82 may have between approximately 5% and approximately 25% less entrained quench liquid 38 compared to the partially cooled syngas 62. To mitigate re-entrainment of the entrained quench liquid 38 separated from the partially cooled syngas 62 in the annular passage 220, the skimming baffle 64 may include a gutter that may collect the entrained quench liquid 38 that is separated from the partially cooled syngas 62. For example, in the illustrated embodiments, the skimming baffle 64 includes a first gutter 224 (e.g., upwardly open annular receptacle or container) radially 152 extending away from the second skimming baffle end 201 and toward the first skimming baffle end 200. The first gutter 224 may have any suitable container geometry extending circumferentially about the axis 161 (e.g., V-shaped annular cup, U-shaped annular cup, etc.). Further, the first gutter 224 may have one or more bottom drain openings or drain conduits leading to the quench bath 48. In other embodiments, the skimming baffle 64 may be made up of one or more segments and the separated quench liquid 38 may drain from the one or both ends of each segment. In still other embodiments, the one segments may be sloped internally or externally to help effect the drainage of the quench liquid 38.

In the illustrated embodiment, a first gutter wall 228 of the first gutter 224 may be oriented at an acute angle relative to the centerline axis 156 of the gasification vessel 12 such that the gutter wall 228 forms an angle 230 between a portion of the concave surface 192 (e.g., curved inner wall of the skimming baffle 64) and an inner gutter wall 232 of the gutter 224. The angle 230 may be equal to, less than, or greater than approximately 5, 10, 15, 20, 25, 30, 35, 40, 45, 50, 55, 60, 65, 70, or 75 degrees. In certain embodiments, the angle 230 may be approximately 1 to 60, 1 to 45, 1 to 30, or 5 to 15 degrees. The angled orientation of the gutter wall 228 may facilitate collection and drainage of the separated entrained quench liquid 38 that may be collected in the gutter 224 towards the bottom region 48 of the quench chamber 30 and into the quench bath 48. In this way, the entrained quench liquid 38 that is separated from the partially cooled syngas 62 may be recycled and reused for cooling of the untreated syngas 20 and/or other downstream processes.

While in the bottom region 84 of the vapor space 72, the first cooled syngas 82 may radially 152 expand and change flow directions from the first direction 172 (e.g., downward direction) to the second direction 186 (e.g., upward direction) to fill the vapor space 72. The radial expansion and change in flow direction from the first direction 172 to the second direction 186 may decrease the flow velocity of the first cooled syngas 82. Consequently, the drag forces acting on remaining entrained quench liquid 38 by the first cooled syngas 82 may also be decreased. Therefore, the entrained quench liquid 38 may be shed from the first cooled syngas 82 to generate the first portion 92 of the second syngas 94. The first portion 92 of the second syngas 94 may mix with the second portion 96 of the second syngas 94 (e.g., portion generated in annular space 74) as the first portion 92 flows toward the syngas outlet 90.

As discussed above, the second portion 96 of the second syngas 94 may be generated from the inner annulus syngas stream 68 in the annular space 74, which is positioned axially 150 above the skimming baffle 64. Unlike the outer annulus syngas stream 70, the skimming baffle 64 may not substantially change a flow direction of the inner annulus syngas stream 68. Therefore, as the inner annulus syngas stream 68 exits the draft tube 52 and enters the passage 208, the inner annulus syngas stream 68 may continue to flow in the second direction 186 (e.g., upward direction) toward the annular space 74. The inner annulus syngas stream 68 radially 152 expands to fill the annular space 74, where the entrained quench liquid 38 is separated from the partially cooled syngas 62 to generate the second portion 96 of the second syngas 94 in a manner similar to the separation of the entrained quench liquid 38 from the outer annulus syngas stream 70. For example, a flow velocity of the inner annulus syngas stream 68 decreases as it radially 152 expands to fill the annular space 74, which results in a decrease in the drag forces acting on the entrained quench liquid 38 by the partially cooled syngas 62. The entrained quench liquid 38 separated from the partially cooled syngas 62 may be collected in a second gutter 240 (e.g., upwardly open annular receptacle or container) extending radially 152 away from a baffle wall 242 of the baffle 80, and directed to the quench pool 48 of the quench chamber 30. The portion 96 may exit the annular space 74 in the first direction 172 through a passage 245 (e.g., annular passage) and into the vapor space 72 before mixing with the first portion 92 of the second syngas 94 and exiting the quench chamber 30 through the syngas outlet 90.

Similar to the first gutter 224, the second gutter 240 may have any suitable container geometry extending circumferentially about the axis 161 (e.g., V-shaped annular cup, U-shaped annular cup, etc.), and may include one or more bottom drain openings or drain conduits leading to the quench bath 48. For example, in the illustrated embodiment, the second gutter 240 includes a second gutter wall 246 extending radially 152 away from a baffle end 248. The second gutter wall 246 is oriented at an acute angle relative to the baffle wall 242 such that the second gutter wall 246 forms an angle 250 between an inner baffle wall 252 of the baffle 80 and a second inner gutter surface 256 of the second gutter 240. The angle 250 may be equal to, less than, or greater than approximately 5, 10, 15, 20, 25, 30, 35, 40, 45, 50, 55, 60, 65, 70, or 75 degrees. In certain embodiments, the angle 250 may be approximately 1 to 60, 1 to 45, 1 to 30, or 5 to 15 degrees.

Figure 4:
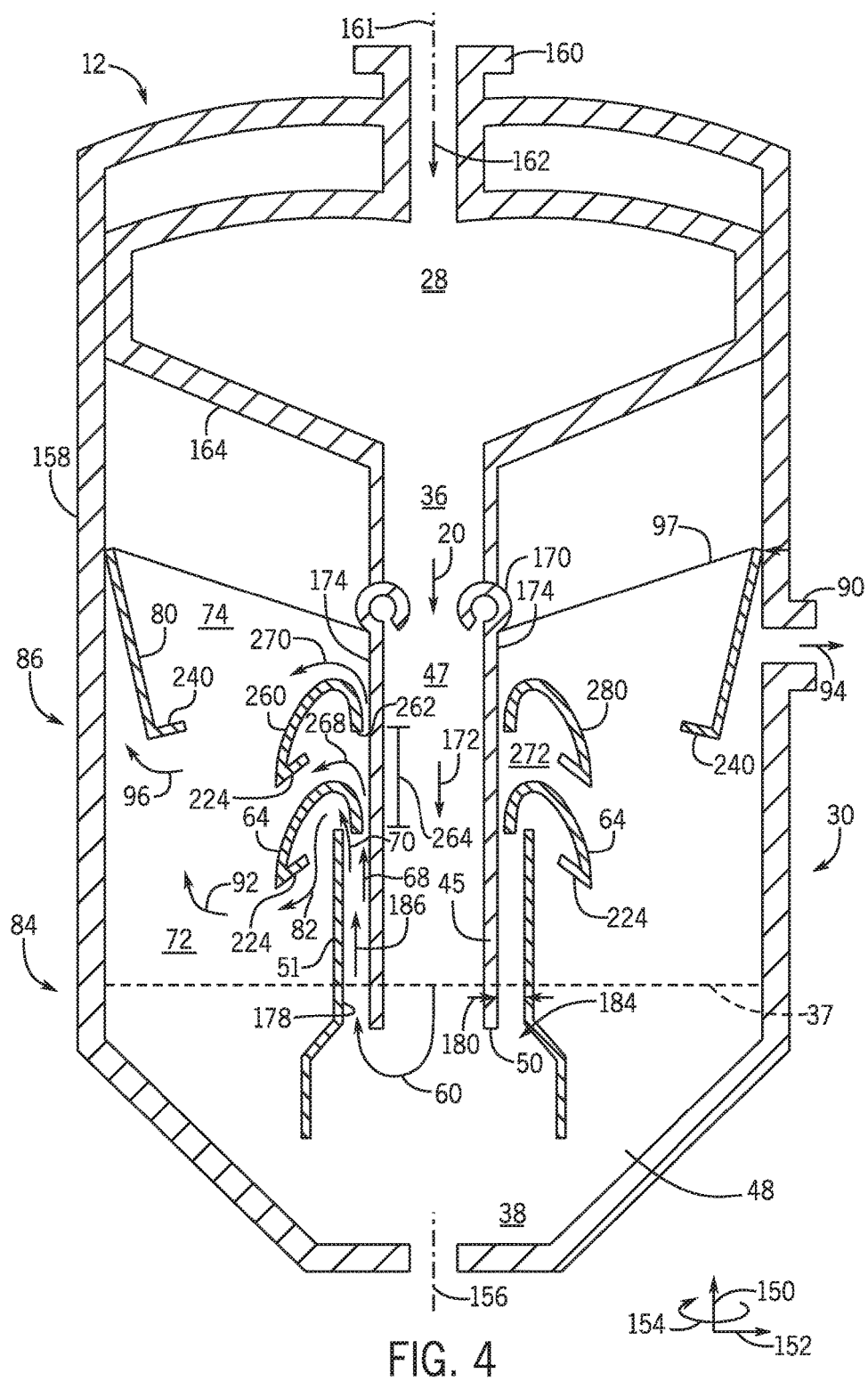
FIG. 4 is a cross-sectional view of an embodiment of the gasification vessel of FIG. 1, whereby the quench chamber includes multiple annular baffles arranged in series along a longitudinal dimension of the gasification vessel.

In certain embodiments, it may be desirable to split a flow of the inner annulus syngas stream 70 into a plurality of smaller streams (e.g., 2, 3, 4, 5, 6, 7, 8, 9, 10, or more streams) to facilitate removal of the entrained quench liquid 38 in the annular space 74. FIG. 4 illustrates an embodiment of the gasification vessel 12 having multiple skimming baffles (e.g., the skimming baffle 64) positioned within the quench chamber 30. For example, in the illustrated embodiment, the quench chamber 30 includes the skimming baffle 64 (e.g., turning annular baffle) positioned at the draft tube outlet 66 and one or more second skimming baffles 260 (e.g., inner turning annular baffles) disposed within the annular space 74. The skimming baffle 64 may be continuous or segmented about the centerline axis 156 of the gasification vessel 12. In certain embodiments, the skimming baffle 64 may extend 360 degrees circumferentially 154 about the centerline axis 156. In other embodiments, the skimming baffle 64 may extend less than 360 degrees circumferentially 154 about a portion of the centerline axis 156. By way of non-limiting example, the skimming baffle 64 may extend 100 degrees, 180 degrees, 225 degrees, or 270 degrees.

The one or more second skimming baffles 260 may be positioned axially 150 away from the skimming baffle 64 in series (e.g., steps) or staggered in the direction of flow, the axial direction 150, and/or the radial direction 152. For example, in the illustrated embodiment, a second skimming baffle end 262 is axially 150 spaced apart from the first skimming baffle end 201 an axial distance 264. In embodiments having multiple skimming baffles 260 (e.g., 2, 3, 4, 5, or more), the distance 264 between the second skimming baffle end 262 of each respective second skimming baffle 260 may be substantially the same such that the second skimming baffles 260 are equally spaced apart (e.g., axially 152 spaced apart) from an adjacent second skimming baffle 260. In other embodiments, the distance 264 between the second skimming baffle ends 262 of each respective second skimming baffle 260 is variable. Radial spacing between the upstream portions of the baffles 260 may be such that the velocity of the inner annulus syngas stream 68 is similar to the velocity of the partially cooled syngas 62 through the annulus 56 between the wall 45 of the dip tube 46 and the wall 51 of the draft tube 52. Similarly, an angle or degree of curvature of each skimming baffle 64, 260 may be the same or different. In embodiment where the angle or degree of curvature of each skimming baffle 64, 260 is different, the flow of the outer annulus syngas stream 70 through each skimming baffle 64, 260 may traverse a different path to the syngas outlet 90.

Similar to the skimming baffle 64, the one or more second skimming baffles 260 may split the flow of the inner annulus syngas stream 68 into a second outer annulus syngas stream 268 and a second inner annulus syngas stream 270. The one or more second skimming baffles 260 may redirect the second outer annulus syngas stream 268 from the second direction 186 (e.g., upward direction) to the first direction 172 (e.g., downward direction). As discussed above, redirecting the second outer annulus syngas stream 268 to flow in the first direction 172 toward the vapor space 72 may increase the effective residence time of the partially cooled syngas 62 within the annular space 74, thereby facilitating removal of the entrained quench liquid 38 in the partially cooled syngas 62. For example, the one or more second skimming baffles 260 define one or more second passages 272. While in the one or more second passages 272, the flow velocity of the second outer annulus syngas stream 268 is further decreased due, in part, to the change in flow direction from the upward second direction 186 toward the downward first direction 172. Therefore, the drag forces acting on the entrained quench liquid 38 by the partially cooled syngas 62 are decreased and the entrained quench liquid 38 is separated from the cooled syngas 62 to generate the second syngas 94, as discussed above with reference to FIGS. 2 and 3. Similar to the skimming baffle 64, the one or more second skimming baffles 260 may include the gutter 224 to collect and direct the entrained quench liquid 38 separated from the partially cooled syngas 62 to generate the second cooled syngas 94.

The gutters 224, 240 may include surface features that may facilitate collecting and directing the entrained quench liquid 38 separated from the partially cooled syngas 62 to the quench bath 48 of the quench chamber 30. For example, turning now to FIGS. 5 and 6, the gutters 224, 240 may include a groove 280 (e.g., v-shaped groove) on the inner surface 232, 256 that may collect the entrained quench liquid 38 that is separated from the partially cooled syngas 62. The groove 280 may include one or more openings 292 that extend through an outer surface 294 (e.g., bottom wall surface) of the gutters 224, 240 that allow drainage and direct the separated entrained quench liquid 38 collected in the groove 280 toward the quench bath 48 of the quench chamber 30. In this way, the separated entrained quench liquid 38 may be mixed with the quench liquid 38 in the quench bath 48 and recycled to continue cooling the untreated syngas 20, as described above. Collecting the separated entrained quench liquid 38 may mitigate re-entrainment of the separated quench liquid 38 by the cooled syngas 82, 94 in the annular space 72 and the annular passage 220, 272, where portions of the annulus syngas stream 68, 70, 268 may have sufficient velocity to increase the drag forces acting on the separated entrained quench liquid 38 and re-entrain the separated entrained quench liquid 38.

In certain embodiments, the one or more openings 292 may include an extension that may direct the separated quench liquid 38 toward the quench bath 48 and mitigate re-entrainment of the quench liquid 38. For example, as illustrated in FIG. 6, the gutter 224, 240 include an extension 296 extending from the one or more openings 292 away from the outer surface 294 of the gutter 224, 240.

As described above, certain embodiments of the gasification system 10 may include one or more skimming baffles (e.g., skimming baffles 64, 260) circumferentially surrounding the dip tube 46 in the quench chamber 30. The one or more skimming baffles may split and redirect a flow of a portion of the partially cooled syngas 62, which may decrease the velocity of the partially cooled syngas 62 and thereby facilitate removal of the entrained quench liquid 38 by reducing the drag forces acting on the entrained quench liquid 38 by the partially cooled syngas 62. Additionally, the one or more skimming baffles may increase a residence time of the untreated syngas 20, which may also facilitate removal of the entrained quench liquid 38 to generate the second cooled syngas 94 by directing the flow of the partially cooled syngas 62 into the lower portion 84 of the vapor space 72. As such, the partially cooled syngas 62 may be forced into the lower portion 84 of the vapor space 72 that would otherwise not be utilized, thereby increasing the effective residence time of the partially cooled syngas 62 in the quench chamber. In this way, the second cooled syngas 94 may have substantially less entrained quench liquid 38 compared to the partially cooled syngas 62. The one or more skimming baffles may include the gutters 224, 240 that may collect and direct the entrained quench liquid 38 separated from the partially cooled syngas 62 to the bottom of the quench bath 48, where it may be reused to cool the syngas 20 in the quench chamber 30.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
 a quench system configured to cool a syngas generated in a gasification chamber, wherein the quench system comprises:
 a quench chamber;
 a dip tube configured to direct the syngas from the gasification chamber into a quench liquid to cool the syngas to generate a cooled syngas;
 a draft tube disposed circumferentially about the dip tube and configured to receive the cooled syngas in a first direction, wherein a first passage is disposed between a first wall of the dip tube and a second wall of the draft tube; and
 a first baffle configured to receive the cooled syngas from the first passage, wherein the first baffle is configured to split a flow of the cooled syngas into a first syngas flow and a second syngas flow, and the first baffle is configured to redirect the first syngas flow in a second direction different from the first direction,
 wherein an upstream end of the first baffle extends at least partially into the first passage between the dip tube and the draft tube.

2. The system of claim 1, wherein the first baffle has a first baffle wall that turns between upstream and downstream ends of the first baffle.

3. The system of claim 2, wherein the first baffle wall has a curved portion that curves between the upstream and downstream ends of the first baffle.

4. The system of claim 1, wherein the first baffle wall extends circumferentially about a central axis of the dip tube.

5. The system of claim 4, wherein the first baffle wall comprises an annular wall that progressively increases in diameter and changes directions from an upstream end to a downstream end.

6. The system of claim 1, comprising a second baffle configured to receive the second syngas flow from the first baffle, wherein the second baffle is configured to split the second syngas flow into a third syngas flow and a fourth syngas flow.

7. The system of claim 6, wherein upstream ends of the first and second baffles are axially offset from one another relative to a central axis of the dip tube, and the first and second baffles extend circumferentially about the central axis.

8. The system of claim 7, wherein each of the first and second baffles has an annular wall that progressively increases in diameter and changes directions from the upstream end to a downstream end.

9. The system of claim 1, comprising an outer baffle radially spaced away from the first baffle, wherein the first baffle and the outer baffle extend circumferentially about a central axis of the dip tube.

10. The system of claim 9, wherein the first baffle comprises a first gutter configured to collect liquid from the cooled syngas, and the outer baffle comprises a second gutter configured to collect liquid from the cooled syngas.

11. The system of claim 1, wherein the first baffle comprises a first baffle wall and a first gutter extending circumferentially about a central axis of the dip tube.

12. The system of claim 11, wherein the first gutter comprises at least one drain configured to direct a liquid separated from the cooled syngas into the quench liquid.

13. The system of claim 11, wherein the first gutter comprises a groove.

14. The system of claim 1, comprising a gasifier having a housing, the gasification chamber disposed in the housing, and the quench system disposed in the housing downstream of the gasification chamber.

15. A system, comprising
 a draft tube configured to mount about a dip tube in a quench system of a gasifier downstream from a gasification chamber, wherein the draft tube is configured to receive a cooled syngas flow from a quench liquid in a first direction; and
 a first baffle configured to split a flow of the cooled syngas from the draft tube into a first syngas flow and a second syngas flow, and the first baffle is configured to redirect the first syngas flow in a second direction different from the first direction,
 wherein the first baffle has a first baffle wall that turns between upstream and downstream ends of the first baffle.

16. The system of claim 15, wherein the first baffle wall extends circumferentially about a central axis of the draft tube.

17. The system of claim 15, wherein the first baffle wall comprises an annular wall that progressively increases in diameter and changes directions from an upstream end to a downstream end.

18. The system of claim 15, wherein the first baffle comprises a first gutter coupled to the first baffle wall and extending circumferentially about a central axis of the draft tube.

19. A method, comprising:
- routing a syngas from a gasification chamber, through a dip tube, and into a quench liquid to cool the syngas to generate a cooled syngas;
- routing the cooled syngas in a first flow direction through a passage between the dip tube and a draft tube disposed circumferentially about the dip tube;
- splitting a flow of the cooled syngas to generate a first syngas flow and a second syngas flow using a baffle positioned adjacent to the draft tube, wherein the baffle comprises a wall extending between a first end and a second end radially and axially spaced apart from the first end, wherein the first end is disposed within the passage and the second end is circumferentially about the draft tube, and wherein the wall turns between upstream and downstream ends of the baffle; and
- directing the first syngas flow into an annular space circumferentially about the dip tube, the draft tube, and the baffle in a second direction that is different from the first direction.

* * * * *